United States Patent [19]
Padliya et al.

[11] Patent Number: 4,909,898
[45] Date of Patent: Mar. 20, 1990

[54] POLYMER RECOVERY FROM SOLUTION

[75] Inventors: Dilipkumar Padliya, Sarnia; Kenneth C. Shepherd, Chatham; Jeffrey T. Reed, Sarnia, all of Canada

[73] Assignee: Polysar Limited, Sarnia, Canada

[21] Appl. No.: 914,154

[22] Filed: Oct. 1, 1986

[51] Int. Cl.⁴ .............................................. B01D 1/00
[52] U.S. Cl. ..................... 159/47.1; 134/10; 134/12; 159/2.2; 159/DIG. 10; 159/DIG. 16; 202/175; 202/205; 202/265; 203/4; 203/88; 203/91; 203/95; 528/499; 528/501; 528/502
[58] Field of Search ............... 159/DIG. 10, 2.2, 47.1, 159/DIG. 16; 134/10, 12; 202/265, 175, 205; 264/102; 203/4, 88, 91, 95; 528/499, 501, 502

[56] References Cited

U.S. PATENT DOCUMENTS

| | | | |
|---|---|---|---|
| 2,719,325 | 10/1955 | Franklin | 159/2.2 |
| 2,833,750 | 5/1958 | Vickers | 159/2.2 |
| 2,992,679 | 7/1961 | Twaddle | 159/2.2 |
| 3,395,746 | 8/1968 | Szako et al. | 159/2.2 |
| 3,457,248 | 11/1969 | Kahre | 159/2.2 |
| 3,799,234 | 3/1974 | Skidmore | 159/2.2 |
| 3,956,060 | 5/1976 | Scoggin | 159/47.1 |
| 4,094,942 | 6/1978 | Nakai et al. | 159/2.2 |
| 4,198,265 | 4/1980 | Johnson | 159/2.2 |
| 4,400,236 | 8/1983 | Hanamura et al. | 159/47.1 |

FOREIGN PATENT DOCUMENTS

0102122 3/1984 European Pat. Off. ........... 159/47.1

Primary Examiner—Virginia Manoharan
Attorney, Agent, or Firm—Stevens, Davis, Miller & Mosher

[57] ABSTRACT

A process for removing substantial quantities of volatile liquid e.g. hydrocarbon from a mixture of polymer and such liquid is provided. This process includes the initial step of introducing the mixture, and a liquid which is immiscible with the polymer, into a mixing/kneading zone provided with heated heat transfer surfaces having a temperature higher than the boiling point of the lowest boiling liquid component in the mixing/kneading zone. The mixture and the immiscible liquid are subjected to a period of continuous mixing and kneading within the mixing/kneading zone, to bring the mixture into continuously moving contact with the heat transfer surfaces. During this period of continuous mixing/kneading, the heated heat transfer surfaces are repeatedly mechanically cleaned to prevent buildup of solid polymer thereon. Volatilized liquid is vented from the mixing/kneading zone during the period of continuous mixing and kneading, and the polymer and residual liquid is subsequently discharged from the mixing/kneading zone.

18 Claims, 6 Drawing Sheets

POLYMER RECOVERY FROM SOLUTION

FIELD OF THE INVENTION

This invention relates to polymer/liquid mixtures such as solutions or slurries of synthetic polymers in organic solvents, and procedures for recovering polymers therefrom.

BACKGROUND OF THE INVENTION

Many synthetic polymers, both elastomers and thermoplastics, are produced by solution or slurry polymerization techniques, so that the polymers are initially obtained as solutions or slurries in solvents/diluents. The recovery of the solid polymer from solution or slurry conventionally involves a series of process steps, each of which requires a significant input of energy. Normally, a steam stripping procedure is adopted, in which the polymer solution or slurry is contacted with steam to flash off the solvent or diluent. The bulk of the added water is drained off the polymer. The polymer is then dried, e.g. by warming and sometimes by use of dewatering and drying extruders, to recover the solid polymer crumb in relatively dry, solvent free form.

Attempts have been made in the past to effect polymer recovery from solutions or slurries in organic solvents or diluents without the use of water, in order to eliminate the water removal steps. Such attempts have centered around the use of an extruder, to effect removal of the solvent by volatilization thereof. In order for such an extrusion process to be successful, the polymer solution must be concentrated, e.g. to about 50% polymer content, to provide a composition of sufficient viscosity for the extruder to efficiently impart energy to it. Such preconcentration is difficult to achieve. It must be done by heating the solution or slurry under carefully controlled conditions to avoid combustion and polymer degradation. The viscosity of polymer solutions increases with increasing polymer concentration, so that the heat transfer requirements of heating apparatus to be used in preconcentration are very demanding. Also, the polymer tends to adhere to the heat transfer surfaces, causing plugging of the equipment, unless the heat transfer surface is continuously wiped, which is difficult to achieve.

It is an object of the present invention to provide a novel process for concentration of polymer in a solution or slurry thereof in a solvent or diluent.

It is a further object of the invention to provide such a process which is comparatively low in its energy requirements.

It is a further object of the invention to provide a novel process for the concentration of polymer in a solution or slurry thereof and for the recovery of the polymer essentially free of solvent or diluent.

SUMMARY OF THE INVENTION

It has now been found that recovery of polymer from solution or slurry can be efficiently accomplished by a process of continuous mixing of the polymer solution or slurry by continuous moving contact with heated heat transfer surfaces, with venting of the vapourized solvent or slurry medium during the mixing process, in the presence of an immiscible liquid, i.e. a liquid which is immiscible with the polymer. During the mixing process of the invention, steps are taken to avoid any significant buildup of polymer solids on the heat transfer surfaces, by arranging continuous mechanical cleaning of the surfaces as the process continues.

Thus in accordance with the present invention, there is provided a process for removing substantial quantities of volatile solvent/diluent liquid from a mixture of polymer and said liquid, which comprises:

introducing said mixture and an immiscible liquid which is immiscible with said polymer into a mixing/kneading zone provided with at least one heated heat transfer surface having a temperature higher than the boiling point of the lowest boiling liquid component in the mixing/kneading zone;

subjecting the mixture and said immiscible liquid to a period of continuous mixing/kneading within the mixing/kneading zone, to bring the mixture and said immiscible liquid into continuously moving contact with the heat transfer surface;

repeatedly mechanically cleaning the heated heat transfer surfaces during the period of continuous mixing/kneading, effectively to prevent buildup of solid polymer thereon;

venting volatilized solvent/diluent and immiscible liquid from said mixing/kneading zone during the period of continuous mixing/kneading;

draining immiscible liquid from a lower point of said mixing/kneading zone; and discharging the polymer containing residual solvent/diluent and immiscible liquid from the mixing/kneading zone.

The step of mixing and kneading the mixture in a mixing/kneading zone provides for a high degree of heat transfer from the heat transfer surfaces to the mixture, and mechanically cleaning the heated heat transfer surfaces during the mixing and kneading prevents buildup of solids on the surface, thereby not only reducing the risk of overheating and degradation of the polymer on the surface but also effectively increasing heat transfer from the heat transfer surface to the mixture.

The presence of an immiscible liquid in the mixture appears to be important for forming a layer between the polymer and the hot surface. Whilst it is not intended that the invention should be limited by any particular theory, it is believed that, because the immiscible liquid and polymer are largely incompatible, the immiscible liquid becomes dispersed throughout the mixture and coats the polymer. Thus the immiscible liquid is first to be heated by contact with the surfaces, and as it is folded into the polymer during the mixing/kneading operations, it heats the polymer and distributes the heat relatively evenly throughout the polymer. Also, the presence of the immiscible liquid effectively prevents adhesion of the polymer to the hot or cold surfaces, thus acting effectively as a lubricating layer. Some immiscible liquids may also help the separation of solvent/diluent from polymer by acting as a stripping agent, lowering the partial pressure of the solvent/diluent inside the mixing/kneading zone and thus increasing the driving force for solvent/diluent evaporation.

Some immiscible liquids may also help to reduce the amount of boiling of the solvent/diluent, thereby reducing the amount of foaming in the mixing/kneading zone. Also, some immiscible liquids may help to increase the overall heat transfer coefficient, thereby improving the heat transfer from the heat transfer surfaces to the mixture of polymer and liquid.

DESCRIPTION OF THE PREFERRED EMBODIMENTS

The mixing/kneading zone into which the mixture of the polymer, solvent/diluent and immiscible liquid is introduced is suitably an apparatus equipped with mixing/kneading elements and having heated boundary walls as heat transfer surfaces to which the mixture is brought into continuously moving contact. The mixing/kneading elements may themselves constitute additional heat transfer surfaces, if they are large enough to be provided with internal heating medium circulation. However, the more important function of the mixing/kneading elements is to ensure continuous intimate mixing of the mixture in the zone, and to ensure that the mixture is in continuously moving contact with the heat transfer surfaces, so that there is no substantial prolonged contact of any portion of the mixture with a heated surface or with the mixing/kneading element. There is preferably no dead-space within the mixing/kneading zone. A large heat transfer surface is provided.

Preferably, the apparatus constituting the mixing/kneading zone is in the form of a stationary drum, equipped with rotary mixing/kneading elements arranged to wipe continuously against the interior of the heated boundary walls as they rotate and perform their mixing/kneading function. In this way the rotary mixing/kneading elements serve to clean the heat transfer walls as they mix and knead.

These mixing/kneading elements can be paddles, arms, bars, discs, disc segments, pins, forward-flighted screws, reverse flighted screws or combinations thereof. These elements are preferably mounted on at least one rotatable shaft within the housing. The use of two shafts is particularly preferred and such shafts may be either co-rotating or counter-rotating during operation and the mixing/kneading elements on the shafts may intermesh or be non-intermeshing during operation. The shaft or shafts may also reciprocate as well as rotate.

Also in the preferred embodiment, a further set of rotary elements is provided, to move relative to the rotary mixing/kneading elements, and arranged to wipe against the mixing/kneading elements as they rotate and thereby clean the surfaces of the mixing/kneading elements, and the rotary shaft on which they are mounted, as the mixing and kneading proceeds. Such an apparatus is available on the commercial market, for example that known as the AP CONTI, available from Dipl. Ing. H. List, Pratteln, Switzerland. Alternatively, the process may be conducted in the mixing/kneading zone of a suitably equipped multi-screw extruder, having the appropriate characteristics, for example the POLYCON, a twin-screw extruder available from Baker Perkins Inc., Saginaw, Mich., U.S.A.

Preferably, the mixing/kneading zone is divided into sub-zones. This can be effected using weirs or baffles mounted on the housing or by using discs, reverse flighted screw elements, unflighted cylindrical restriction means, or shallow flighted forwarding screw elements mounted on the shaft or shafts. Also preferred is to have liquid removal means in at least one of the sub-zones. This liquid removal means is located in the lower half of the housing and is preferably provided with means to keep the liquid removal means clear of polymer.

In one embodiment of the present invention, the mixture of ingredients is pre-formed and then introduced into the mixing/kneading zone of the apparatus. A suitable, typical such mixture would comprise, per 100 parts by weight of mixture and immiscible liquid, from about 15 to about 30 parts by weight of polymer, from about 5 to about 20 parts by weight of immiscible liquid, and the rest being the solvent/diluent. Preferably, the mixture is pressurized and heated prior to introduction into the apparatus, following which the pressure is reduced to atmospheric as it enters the heated apparatus. In this way, a substantial amount of volatile liquid is flashed off immediately. Thus, the apparatus is preferably provided with a vent close to the point of introduction of the mixture, to provide means to rapidly remove such vapour.

In a further embodiment of the present invention, the immiscible liquid can be added separately by a separate inlet to the mixing/kneading zone of the apparatus and the polymer-liquid mixture can be added to the main inlet point. The amounts of materials will be as expressed hereinbefore and the preferred pressurizing and heating of the mixture is also applicable.

In practice, the mixing/kneading zone is maintained from about one quarter to about three quarters full of mixture to allow sufficient evaporative and mixing/kneading space within the mixing/kneading zone for efficient liquid removal. This zone can be operated at any suitable pressure, i.e. atmospheric, below atmospheric or above atmospheric, within the tolerance limits of the chosen apparatus.

In one preferred embodiment of the present invention, the polymer discharged from the mixing/kneading zone is supplied to a devolatilizing extruder to remove residual solvent/diluent and immiscible liquid in the polymer, thereby yielding polymer containing essentially no solvent/diluent or immiscible liquid and which is suitable, after cooling, for packaging.

Figure 1:
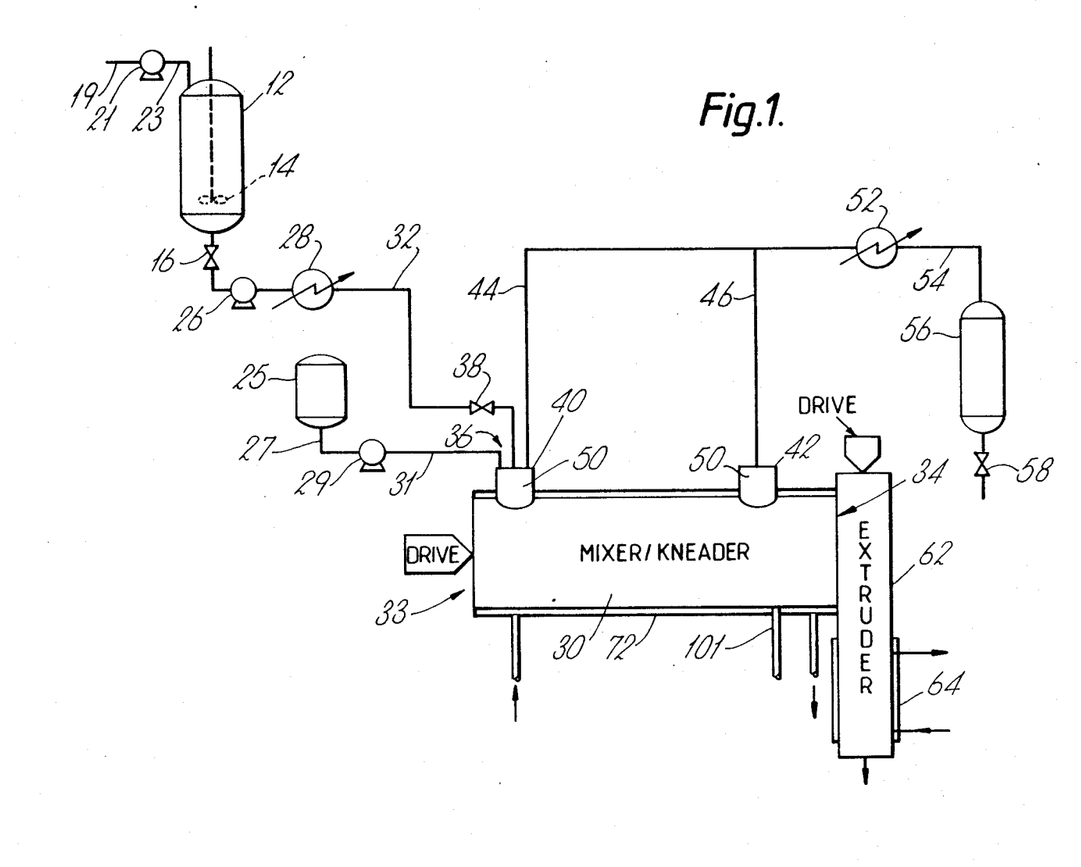
FIG. 1 is schematic representation of an apparatus and process flow sheet for removing liquid from a mixture of polymer and said liquid utilizing the invention.

Referring to FIG. 1, it can be seen that the polymer recovery system includes a feed holding tank 12 equipped with an agitator 14 and a valved outlet 16. The outlet 16 is connected to pump 26 which in turn is connected to heat exchanger 28. Line 32 supplies the feed from heat exchanger 28 via pressure reducing valve 38 to the inlet 36 of the mixing/kneading apparatus 30. Immiscible liquid is supplied by either of two means. One such means utilizes feeding immiscible liquid by line 19 to pump 21 and line 23 into feed holding tank 12.

A second such means utilizes a reservoir 25 for immiscible liquid which passes through line 27, pump 29 and line 31 into the inlet 36 of the mixing/kneading apparatus 30.

The mixing/kneading apparatus 30 has two vent ports 40 and 42 located at spaced intervals along its length, to which are connected respective vapour conduits 44, 46. The portion of each of these vent ports is provided with a jacket 50 through which heat transfer medium can flow. These vapour conduits 44, 46 are connected to a heat exchanger 52 for solvent condensation. A further conduit 54 connects the heat exchanger 52 to a solvent storage drum 56 which has a valved outlet 58. Vent port 40 is equipped with inlet 36 through which the feed and optionally immiscible liquid are supplied by lines 32 and 31 respectively.

At the downstream end 34 of the mixing/kneading apparatus 30, a downwardly-extending twin-screw discharge extruder 62 is connected. This extruder 62 is provided with a jacket 64 through which heat transfer medium can flow.

Figure 2:
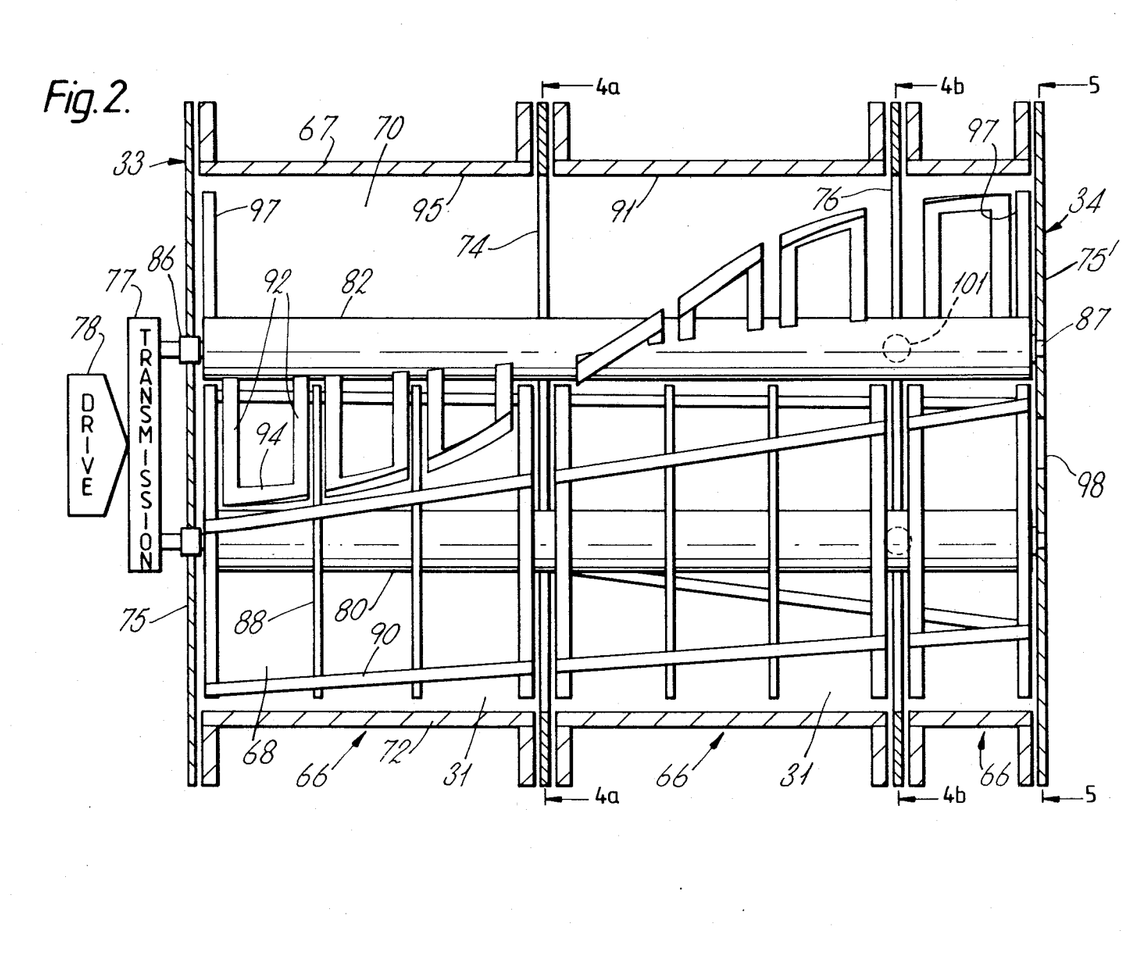
FIG. 2 is a detailed diagrammatic view partly in section of a mixing/kneading zone of the apparatus of FIG. 1, taken along the line 2—2 of FIG. 1 so as to show the lower part in plan.

The mixing/kneading apparatus 30 will now be described in more detail with reference to FIGS. 1 to 5. The apparatus has an internal mixing/kneading zone and is shown in FIG. 2 as consisting of three interconnected, commercially-available AP CONTI modules 66 similar to the apparatus described in U.S. Pat. No. 3,689,035. All the modules are not identical: they may be equipped with vent ports, drain openings and the like. However, all the modules are of otherwise similar configuration. From three to ten of such modules 66 can be interconnected to form the mixing/kneading apparatus. These modules 66 each have a housing 67 with a "FIG. 8"-shaped cross-section (FIG. 4a). One portion of the cross-section (FIG. 3) is the main housing portion 68 and the other portion is the auxiliary housing portion 70. The housing 67 as a whole is provided (FIG. 2) with an outer jacket 72, for heating and cooling purposes. The jacket is suitably designed for handling pressurized fluids up to about 12 atmospheres at temperatures up to about 350° C..

Figure 4A:
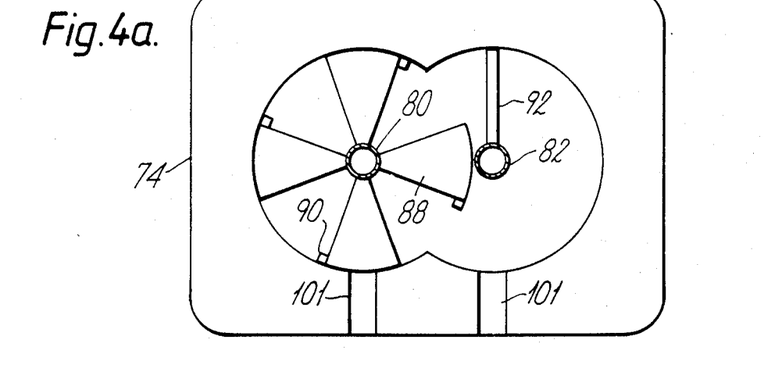
FIGS. 4a and 4b are cross-sectional views of the apparatus along the lines 4a—4a and 4b—4b respectively of FIG. 2.
Figure 4B:
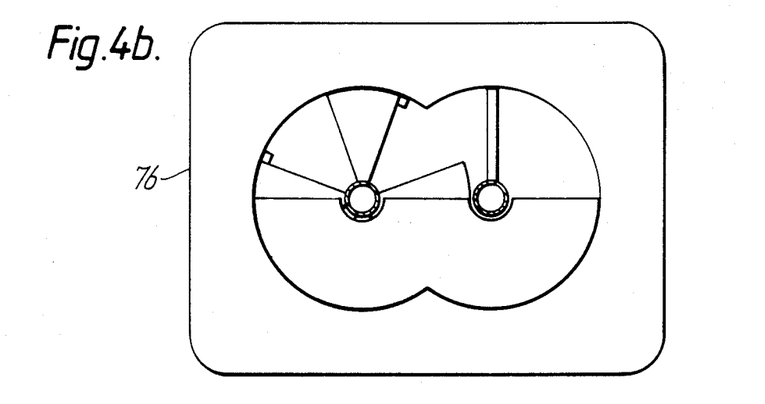

The modules are interconnected via spacer plates 74, 76 shown on FIGS. 4a and 4b, which are of two different types. Spacer plate 74 is simply a metal gasket of the same size and periphery as the ends of the modules it interconnects. It allows for free flow and communication of materials contained in the mixer, between one module and the next. Spacer plate 76 is a metal gasket equipped with a weir plate extending part way up from the bottom periphery and having a straight horizontal upper edge, with appropriate indentations to accommodate the shafts of the mixing/kneading apparatus, so as to provide a weir between adjacent modules, whereby hold-up and thus residence time of material in a given module can be controlled. The height of the upper edge of the spacer plate 76 may be adjusted for this purpose.

The upstream end 33 and the downstream end 34 (FIG. 1) of the apparatus are each provided with "FIG.-8"-shaped flanged covers 75 and 75' (FIG. 2). At the upstream end 33 of the apparatus, there is provided a transmission 77 and a drive motor 78 capable of providing variable speed rotation to each shaft. Each module has two hollow shafts 80, 82 rotatably mounted therein, the first mixing shaft 80 being located in the main housing portion 68 and the other, cleaning shaft 82 being parallel to the mixing shaft 80 and located in the auxiliary housing portion 70. At the inlet end of the apparatus, packing rings 86 are located between the shafts 80, 82 and the flanged cover 75. At the outlet end of the apparatus, shafts 80 and 82 are supported and rotate on pins 87.

Figure 3:
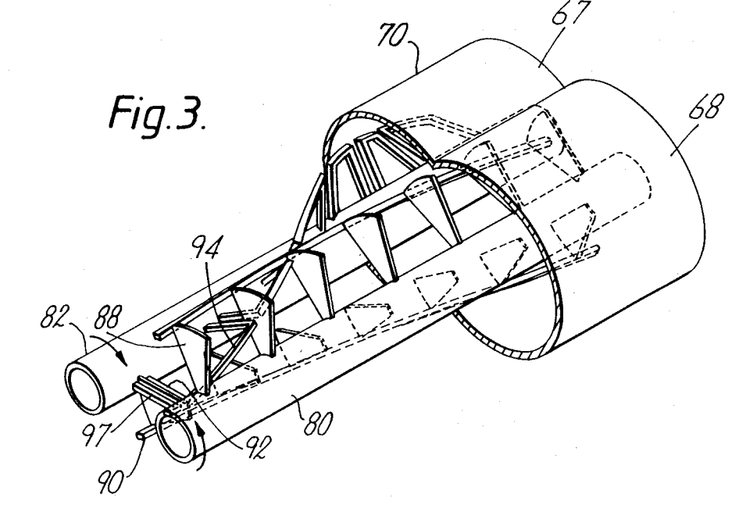
FIG. 3 is a perspective view of the mixing/kneading zone of FIG. 2.

As best shown in FIG. 3, mounted on the mixing shaft 80 are axially spaced, radially extending, disk-shaped hollow segments 88 arranged in four circumferentially spaced sets, each set extending helically down the shaft 80, only two of which are shown in FIG. 3 for clarity purposes. Each set of segments 88 is connected together along the leading periphery by kneading bars 90 which extend along a helical line from one end of the shaft 80 to the other. These kneading bars contact the inner surface of the main housing portion 68.

The cleaning shaft 82 has one set of helically arranged, radially extending arms 92 with adjacent pairs of these arms 92 being interconnected by cleaning bars 94 to provide a hurdle-type arrangement. These cleaning bars 94 contact the inner surface of the auxiliary housing portion 70. The helical angle of the arms 92 is greater than that of the mixing shaft kneading bars 90 and is chosen so that the arms 92 of the cleaning shaft 82 mesh with and clean the sides of the disk-shaped hollow segments 88 of the mixing shaft 80 upon rotation of the two shafts 80, 82. Also, the height of the upper surfaces of the cleaning bars 94 is arranged so that they can wipe the undersurface of kneading bars 90 and the surface of shaft 80. End wall wipers 97 are optionally provided (FIG. 2) at each end of the mixing shaft 80 to wipe the inside surfaces of the flanged covers 75 and 75'. Spacer plate 76 as shown in FIG. 4b may be wiped with additional wipers which may be provided on the shafts for that purpose. Suitably, the motor and transmission can drive the mixing shaft at 3–20 rpm and the cleaning shaft at 12–80 rpm. The speed ratio of the mixing shaft to the cleaning shaft is preferably essentially constant at from 1:2 to 1:6, most preferably at about 1:4.

Figure 5:
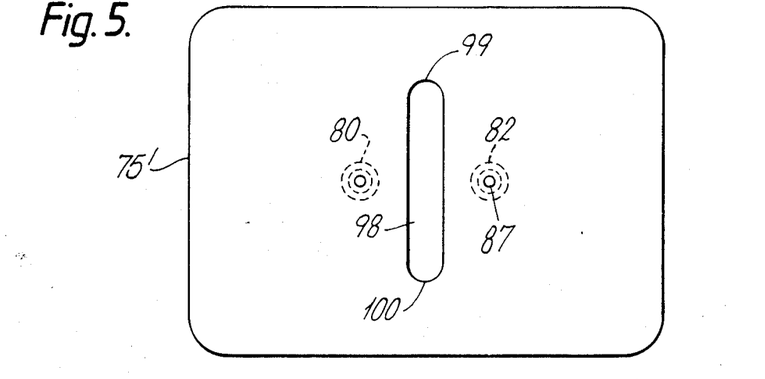
FIG. 5 is a cross-sectional view along line 5—5 of FIG. 2.

At the downstream end 34 of the apparatus 30, the flanged cover 75', as can be best seen in FIG. 5, is provided with a vertical slot 98 extending from apex 99 to apex 100 of the "FIG.-8"-shaped cross-section of the housing and with circular apertures for pins 87 to support shafts 80 and 82. This slot 98 provides communication to the downwardly extending extruder 62.

Also provided toward the downstream end 34 of the apparatus 30 is a drain opening 101 indicated in FIGS. 1, 2 and 4a. This drain opening is suitably covered by a screen to retain polymer. This screen is most suitably made up of tri-rod or iso-rod screen bars, a wire mesh, or a plate with plurality of small holes therein.

The extruder 62 is provided with a variable speed drive (not shown) so that suitably the screw of the extruder can be driven at speeds from 10–200 rpm.

It will be noted that the apparatus 30 of the preferred embodiment described above is an apparatus provided with vents, drains, etc. Material is moved downstream therein, not by the rotation and disposition of the mixing elements, but is gently pushed by the kneading bars 90 and 94, with positive discharge, out of exit slot 98 into extruder 62. The apparatus 30 is in no sense an extruder, because the mixing/kneading elements are not capable of compressing the polymer for the apparatus to act as an extruder.

An alternative apparatus in which the process of this invention may also be practised is a form of continuous-reactor-extruder. One commercial such apparatus is the POLYCON from Baker Perkins. Such an apparatus is a co-rotating intermeshing twin-screw extruder in which the screw has an L/D ratio of about 5:1 to 20:1, preferably about 8:1 to about 15:1, and in which the screw design is modular in form and has a limited feed section, a significant kneading/mixing section and a limited discharge section. The design of the screw flight is different in the three sections to provide the appropriate action needed in that section.

Figure 6:
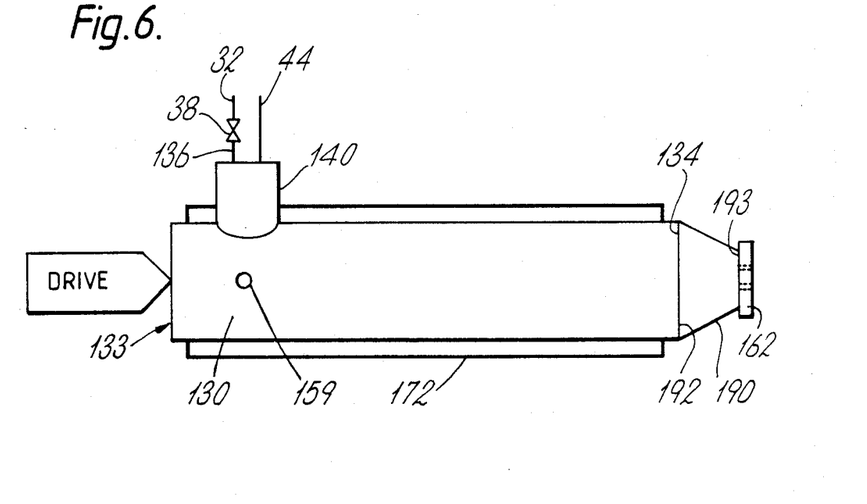
FIG. 6 is a diagrammatic view of an alternative apparatus for use in the invention.

Referring to FIG. 6 it is seen that the apparatus 130 has one vent port 140 located at the top near the upstream end. To this vent port vapor conduit 44 may be connected for the operation of this process. At the downstream end a die plate 162 is provided for the discharge of the product.

Such apparatus will now be described in detail with reference to FIGS. 6 to 8. It consists of three internal zones—(1) feed zone 163, (2) mixing/kneading zone 164 and (3) discharge zone 165. These zones are housed in a barrel 167 with "FIG.-8" shaped cross-section. The barrel is equipped with a vent port 140 and a side feed opening 159. Alternately feed may be introduced into the apparatus 130 via inlet means 136 on the vent port 140. The barrel has two parallel screws 180 rotatably mounted therein. The barrel as a whole is provided with an outer jacket 172 for heating and cooling purposes. The jacket is suitably designed for handling pressurized fluids up to about 10 atmospheres at temperatures of up to about 340° C. The barrel housing is such that it allows for free flow and communication of materials contained in the apparatus between one zone and the next.

The upstream end 133 of the apparatus 130 is provided with a flanged cover 175. At this end of the apparatus a drive motor and a transmission are provided for variable speed rotation of the two shafts. Packing glands 186 are located between the screws and the flanged cover on the inlet-end. At the downstream end an adapter 190 is provided for attaching die plate 162 onto the apparatus to permit discharge of the product. The length of the adapter is kept as short as possible to minimize dead volume.

The screws are assembled by mounting desired screw and kneading elements on shafts. The screw and kneading elements are of the following types—forward flighted screw elements, deep flighted forward screw elements, shallow flighted forward screw elements, reverse flighted screw elements, paddles, pitched paddles, discs or their combinations. Deep flighted forward screw elements and forward flighted screw elements are used in the feed zone. Paddles, pitched paddles, forward flighted screw elements or their combinations are used in the mixing/kneading zone. Forward flighted screw elements, shallow flighted forward screw elements or their combinations are used in the discharge zone. Discs, reverse flighted screw elements, shallow flighted forward screw elements or their combination may be used for creating different pressure zones within the apparatus.

Figure 7:
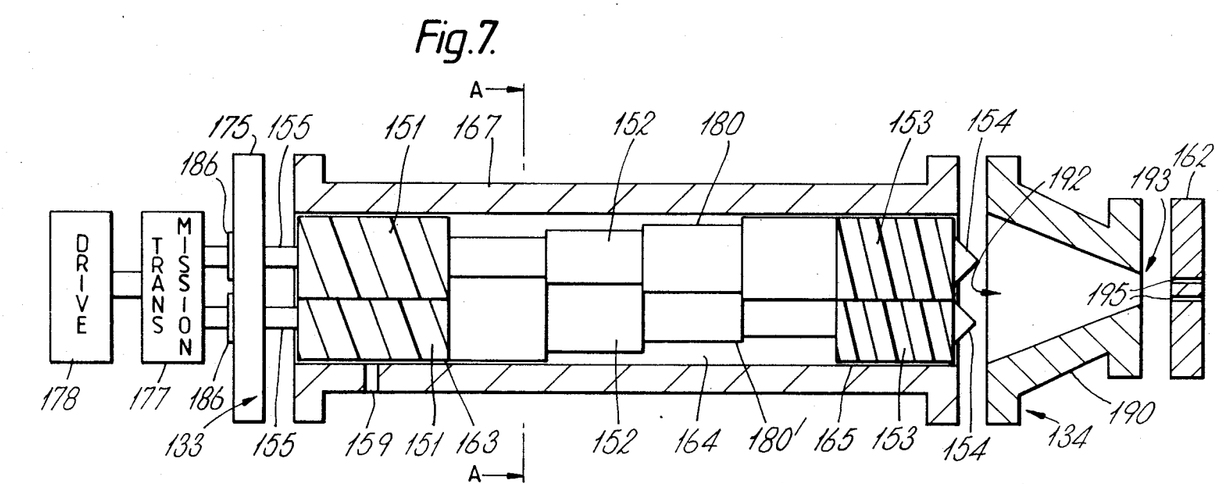
FIG. 7 is a detailed diagrammatic view of the apparatus of FIG. 6.
Figure 8:
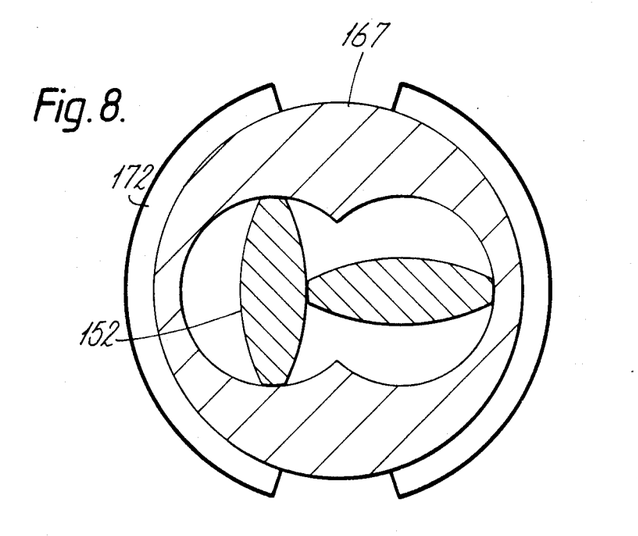
FIG. 8 is a cross-sectional view of the apparatus of FIG. 7 at lines A—A.

The screws 180 and 180' are of identical design which is shown in FIG. 7. A deep flighted forward screw element 151 forms the screw in the feed zone 163. Next paddles 152 (see also FIG. 8), each equally helically displaced, form the screw in the mixing/kneading zone 164. This is followed by a shallow flighted forwarding screw element 153 forming the screw in the discharge zone 165. The discharge screws, by compressing the polymer within the discharge zone, effectively form a seal which prevents entry of air into the apparatus or discharge of the vapors to the outside. The above described screw elements are mounted on shaft 155 in the order described and held in place by a cap nut 154.

When installed inside the apparatus the screws are mounted in such a fashion that they intermesh and wipe each other. The two screws rotate in the same direction i.e. they co-rotate. Suitably the motor and the gear box can drive the two screws at 25–250 rpm.

At the downstream end 134 of the apparatus 130, the adapter 190, as shown in FIG. 7, is provided with an opening 192 large enough to cover the "FIG.-8" shaped cross-section converging to a smaller circular opening 193. A die plate 162 containing die openings 195 is attached to the adapter for discharge of the polymer.

The operation of the polymer concentration apparatus will now be described with reference to FIG. 1. Prior to start up, the various heat transfer media are fed into the apparatus at the required locations. Throughout the process, heat transfer fluid is circulated in the jacket of the heat exchanger 28, heat transfer fluid is circulated in the jacket and the hollow shafts of the apparatus 30, and in the jackets of the vapour conduits 44 and 46., and cooling medium is circulated in the second heat exchanger 52 and the jacket of the discharge extruder 62.

Polymer, solvent/diluent, immiscible liquid (water in these particular experiments) of approximate relative amounts 10 to 40 weight per cent polymer, 15 to 25 weight per cent immiscible liquid, the balance being solvent/diluent, is stored in the feed storage tank 12, and is then pumped into the heat exchanger 28. Heat transfer fluid is circulated through the heat exchanger 28 to raise the temperature of the polymer mixture.

The mixture from tank 12 is superheated under pressure in heat exchanger 28 (such as to about 140° C.) and is passed through the pressure reducing valve 38 and into the mixing/kneading apparatus 30 through inlet 36, which is at lower pressure, causing some of the solvent-/diluent and immiscible liquid in the mixture to be flashed off. Vent 40 in the apparatus is in close proximity to the inlet 36, to remove a substantial amount of the immiscible liquid and solvent/diluent vapours immediately, thereby preventing the creation of solvent/diluent-rich vapour in the upstream end 33 of the apparatus 30, which would have the effect of discouraging further evaporation of the solvent/diluent. The pressure reduction valve 38 is as close to the inlet 36 of the apparatus 30 as physically possible, to prevent solvent flashoff in the conduit 32, which would result in polymer buildup on the conduit walls. Vent port jackets 50 can be provided with heating fluid, to prevent solvent condensation and return thereof to the mixing/kneading zone.

The temperature of the mixture entering the mixing/kneading zone 31 is slightly above the boiling point of the liquid with the lowest boiling point in the apparatus; e.g. in a hexane/water system the temperature is about 70° C. When the mixture enters the apparatus 30, it immediately contacts moving, heat transfer surfaces in the form of the mixing shaft 80 and cleaning shaft 82 and also contacts the heated walls of the housing 67. As it is moved through the zone, the material is simultaneously heated, mixed and kneaded. By the time the material reaches the downstream end, its temperature approaches the boiling point of the higher boiling liquid., e.g. in a hexane/water system this is about 90° to 100° C. The kneading bars 90 on the mixing shaft 80 wipe the walls 91 of the main housing portion 68, and the cleaning bars 94 on the cleaning shaft 82 wipe the mixing shaft 80 and the walls 95 of the auxiliary housing portion 70. The arms on the cleaning shaft also wipe the surfaces of the spacer plate 76. The wipers 97 on the ends of the shafts 80, 82 wipe the flanged covers 75 and 75'. This self-wiping action within the mixing/kneading zone 31 of the apparatus 30 ensures that none of the polymer sticks to the heat transfer surfaces for any period of time.

The consistency of the material changes as it moves along the apparatus, as solvent/diluent evaporates. By the time it reaches the second vent, it has become a two-phase mixture, of immiscible liquid, and dough-like polymer, containing solvent/diluent. The solvent is compatible with the polymer, so that as long as a drain hole 101 is not located too far upstream, only immiscible liquid will be drained off. The immiscible liquid should not be drained off too soon, or the benefit of its presence is lost during subsequent mixing/kneading. In practice, 80 to 90 per cent of the immiscible liquid from the mixture is drained off, before the material leaves the apparatus 30. The material leaving the apparatus is 70-85 per cent solids i.e. about 70 to about 85 weight per cent of polymer and about 15 to about 30 weight per cent of solvent/diluent and the immiscible liquid. The exit temperature is around the boiling point of the immiscible liquid, e.g. about 100° C. in the case of water.

The material exits from the apparatus through the slot 98 and enters the extruder 62. The extruder 62 compacts and pressurizes the material to about 10 to 20 atmospheres. The extruder 62 extrudes the material in a continuous string form for ease of handling. The twin-screw extruder can be cooled or heated if desired by circulating heat transfer medium through the jacket 64. Optionally, the material may then go to a downstream devolatilizing extruder to remove any residual hydrocarbon and immiscible liquid.

The extruder is not an essential part of the apparatus, but is advantageous to use as it prevents buildup of material in the mixer, and acts as a seal in the apparatus to prevent ingress of oxygen, water or the like, thereby minimizing the risk of explosions, and minimizing the risk of degradation of the product. It also prevents the escape of the solvent/diluent vapours into the atmosphere which may pose an explosion or health hazard.

The vapours escaping through the vents are condensed in the second heat exchanger 52 and collected in the drum 56.

The form of apparatus illustrated and described above is, of course, for exemplification purposes only, and many variations thereto are possible within the scope of the invention. For example, each sub-zone of the mixing/kneading zone 31 may terminate in a spacer plate of the metal gasket type 74 or the weir plate type 76. A twin-screw extruder, such as a POLYCON, equipped to operate at elevated pressures, and with an appropriate mixing/kneading zone, can be substituted for the apparatus illustrated and described.

The process of the invention is useful with a wide variety of polymers and solvents. The polymer may be a rubber polymer such as polybutadiene, polyisoprene, poly(isobutylene-isoprene), halogenated poly(isobutyleneisoprene), styrene-butadiene copolymer (SBR), butadiene-acrylonitrile copolymer (NBR), hydrogenated butadiene-acrylonitrile polymers (HNBR), ethylenepropylene copolymer (EP), ethylenepropylene-diene terpolymer (EPDM), etc. It may be a thermoplastic polymer such as polyethylene, polypropylene, polystyrene, impact polystyrene, ABS resin, polyacrylonitrile, polyamide, polyester etc. It may be in solution or in slurry in the organic liquid. The polymer is preferably selected from butyl rubber, bromobutyl rubber, chlorobutyl rubber, EPDM, EP, SBR, NBR, HNBR, polystyrene and impact polystyrene.

Similarly, the volatile solvent/diluent liquid may be chosen from a wide range of possibilities, provided that it is volatile under the conditions encountered in the mixing/kneading zone. The volatile solvent/diluent liquid is preferably selected from volatile saturated hydrocarbons, unsaturated hydrocarbons, halohydrocarbons, halocarbons, oxygenated hydrocarbons, and hydrocarbon oils or mixtures thereof. It may for example be a liquid lower molecular weight paraffinic hydrocarbon such as pentane, hexane, heptane, octane etc., or an aromatic hydrocarbon such as benzene, toluene or xylene, etc.

The immiscible liquid can be either miscible or immiscible with the solvent/diluent but must be immiscible with the polymer and must have a higher boiling point than that of the particular solvent/diluent. The immiscible liquid is preferably chosen from water, alcohols, volatile saturated hydrocarbons, unsaturated hydrocarbons, halohydrocarbons, halocarbons, etc. depending on the nature of the polymer.

The process will further be described with respect to the following specific examples which were carried out using an AP CONTI and a POLYCON.

EXAMPLE 1

Bromobutyl rubber cement in hexane with appropriate stabilizing and antioxidant chemicals added thereto was used as a feed cement. A three-module AP CONTI was used for the experiments. Hot oil was used as heating medium in the AP CONTI and in the heat exchanger 28 (FIG. 1). Cold water was used to condense vapours in the heat exchanger 52 and was used in the jacket of the discharge extruder 62. Hot oil temperatures in the jacket in various experiments were 150° C. and 160° C. The immiscible liquid used was water and water contents of the feed were zero (i.e. a control), 10 and 20 weight per cent, and the material throughput rates were between 121 and 563 pounds per hour. Table 1 gives the conditions and results of the tests.

All the experiments produced a product with a total volatiles content between 17 and 23 weight per cent. Water content varied between 9 and 13 per cent.

As shown in Table 1, tests were conducted with zero per cent (Expt. No. 1); 10 per cent (Expt. No. 2); 20 per cent (Expt. No. 3) water, and 19 per cent (Expt. No. 4) water added to the rubber cement. When no water was in the feed, severe foaming occurred inside the apparatus. At the feed rate shown for Expt. No. 1 and with an oil temperature of 150° C., the foam was carried into the vapour conduits causing the lines to plug. The discharge from the extruder had the "soupy" appearance of dense rubber. This experiment could not be run for a long time because of the plugging and was unsatisfactory.

Upon addition of between 10 and 20 per cent water, as was done in Expts. No. 2, 3 and 4, the behaviour of the cement and the end product changed dramatically. The foaming, and therefore the tendency of the vapour conduit to plug, was greatly reduced. Throughput rates could be increased significantly without increasing the foaming. Due to the mixing and kneading action of the mixing discs and the kneading bars, water and cement were maintained in a well-mixed state inside the mixing/kneading zone of the apparatus. The extruder 62 was cooled during the tests and served to seal the outlet of the mixing/kneading apparatus so that the product from the extruder was of essentially the same composition as the material exiting the mixing/kneading apparatus. Alternatively, the extruder could have been used to supply the product to a devolatilizing extruder, as known in the art, which would significantly reduce the remaining volatile components.

The heat transfer coefficients reported in Table 1 were calculated by carrying out a heat balance around the apparatus. The energy enters the system with the feed, by transfer across the housing walls and by frictional dissipation of mechanical energy. The energy sinks are the water and solvent vapours, the product leaving the mixer and heat losses to the environment. The reported values are calculated using standard equations involving feed rates, vapour flow rates, product flow rates, specific heat capacities of the substances, temperature measured, heats of vapourization of the appropriate substances, fractional solids content and fractional water content to derive heat flows and then heat transfer coefficients. The results are strikingly improved when water is present, indicating a much more efficient polymer concentration process in the presence of water.

EXAMPLE 2

Bromobutyl rubber cement containing bromobutyl dissolved in hexane was used as the feed. A POLYCON was used with hot oil at 140° C. as the heat medium in the jacket. Water, as the immiscible liquid, was added to the feed for an overall composition of bromobutyl 18.2 weight %, water 20 weight % and the balance hexane. This feed was fed to the POLYCON at a rate of 44.9 pounds per hour.

There was very little foaming, whereas without water present foaming was excessive, and plugging of vapour conduits was minimal. The total volatiles content of the product was 3.8%. The details are shown in Table 1.

EXAMPLE 3

Similar experiments using polybutadiene dissolved in a benzene-butene-1 mixture (also containing a small amount of butadiene-1,3 monomer) and polybutadiene dissolved in a cyclohexane-butene-1 mixture (also containing a small amount of butadiene-1,3 monomer) with water as the immiscible liquid exhibited little foaming during the concentration step and yielded products suitable for further handling. Similarly, hydrogenated butadiene-acrylonitrile polymer in chlorobenzene with ethylene glycol as the immiscible liquid behaved in the same way.

ture comprises about 10 to about 40 parts by weight of polymer per 100 parts by weight of said mixture, which comprises:
introducing said mixture and an immiscible liquid which is immiscible with said polymer into a mixing zone which comprises a housing with at least one mixing shaft rotatably mounted therein and having mixing means attached thereto and provided with at least one heated heat transfer surface having a temperature higher than the boiling point of the lowest boiling liquid component in the mixing zone, the amount of said immiscible liquid being from about 5 to about 50 parts by weight per 100 parts by weight of said mixture;
subjecting the mixture and said immiscible liquid to a period of continuous mixing within the mixing zone, to bring the mixture and said immiscible liquid into continuously moving contact with the heat transfer surface;
repeatedly mechanically cleaning the heated heat transfer surfaces during the period of continuous mixing, effectively to prevent buildup of solid polymer thereon;
venting volatilized diluent and immiscible liquid from said mixing zone during the period of continuous mixing;
draining immiscible liquid from a lower point of said mixing zone; and
discharging the polymer from the mixing zone containing from about 15 to about 30 weight per cent of residual diluent and immiscible liquid.

2. The process of claim 1 wherein the immiscible liquid is premixed with the mixture prior to introduction in said mixing zone.

3. The process of claim 1 wherein the immiscible liquid is added separately from the mixture into the mixing zone.

4. The process of claim 1 including the step of superheating said diluent liquid under pressure prior to introducing said mixture into said mixing zone.

5. The process of claim 4 wherein the introduction of the mixture into the mixing zone is accompanied by a pressure reduction thereof, with consequent flash evaporation of at least a portion of said diluent liquid.

6. The process of claim 5 in which the diluent which is flash evaporated is vented from the mixing zone at a location adjacent to the introduction location thereto.

7. The process of claim 6 wherein diluent which is flash evaporated is vented from the mixing zone from at least one additional location prior to discharge of the polymer and residual liquids from the mixing zone.

TABLE 1

| Expt. No. | Solids Content % | FEED Water Cont. % | Rate lb/hr | Temp. °C. | Hot Oil Temp. °C. | Product Total Volat. % | Water Content % | Water Drained lbs/hr | Heat Transfer Co-Eff. BTU HR-FT$^2$-°F. |
|---|---|---|---|---|---|---|---|---|---|
| Example 1 | | | | | | | | | |
| 1 | 18.3 | 0 | 121 | 115–118 | 150 | 22.5 | 9.7 | 0 | 9 |
| 2 | 16.0 | 10.0 | 272 | 114–123 | 150 | 17.0 | 8.8 | 0 | 33 |
| 3 | 14.6 | 20.0 | 148 | 113–118 | 150 | 21.4 | 10.3 | 0 | 31 |
| 4 | 15.8 | 19.0 | 563 | 127 | 160 | 21.0 | 13.0 | 99 | 25 |
| Example 2 | | | | | | | | | |
| — | 18.2 | 20.0 | 44.9 | 21–24 | 140 | 3.8 | — | 0 | 37 |

What is claimed is:

1. A process for removing volatile diluent liquid from a mixture of polymer and said liquid, wherein said mix- 8. The process of claim 6 wherein vacuum is applied to said mixing zone at a vent adjacent to the location of introduction of said mixture.

9. The process of claim 7 wherein vacuum is applied at said additional location of said mixing zone.

10. The process of claim 1 wherein from about 10 to about 20 parts by weight of immiscible liquid per 100 parts by weight mixture is introduced.

11. The process of claim 10 wherein the volatile diluent liquid is selected from the group consisting of volatile saturated hydrocarbons, unsaturated hydrocarbons, halohydrocarbons, halocarbons, oxygenated hydrocarbons and hydrocarbon oils.

12. The process of claim 10 wherein the immiscible liquid is miscible with said diluent.

13. The process of claim 12 wherein the immiscible liquid is selected from the group consisting of water and lower alcohols.

14. The process of claim 13 wherein said polymer is selected from the group consisting of bromobutyl rubber, chlorobutyl rubber, butyl rubber, polybutadiene rubber, ethylene-propylene-diene terpolymer, ethylene-propylene copolymer, styrene-butadiene copolymer, butadiene-acrylonitrile copolymer, polystyrene and impact polystyrene.

15. The process of claim 14 wherein said immiscible liquid is water.

16. The process of claim 1 including the step of passing said polymer through an extruder after said polymer has been discharged from said mixing zone.

17. The process of claim 16 wherein said polymer is discharged from said mixing zone to an extruder operated at an elevated temperature whereby the temperature of said polymer is raised by passage through said extruder and wherein said polymer from said extruder is fed into and passed through a devolatilization extruder whereby residual volatile components are removed from said polymer.

18. The process of claim 1 wherein liquid is removed from said mixing zone at a location adjacent to a location for discharging said polymer.

* * * * *